United States Patent [19]

Book

[11] 4,295,488
[45] Oct. 20, 1981

[54] DIAPHRAGM AND BALL VALVE

[76] Inventor: Harold M. Book, P.O. Box 323, 15876 Beechwood Rd., Findlay, Ohio 45840

[21] Appl. No.: 10,692

[22] Filed: Feb. 9, 1979

[51] Int. Cl.³ .................. F16K 31/18; F16K 33/00
[52] U.S. Cl. ................................. 137/414; 137/426; 137/445; 137/449; 251/30; 251/45; 4/324; 4/325; 4/326
[58] Field of Search ............ 137/414, 449, 410, 426, 137/445, 451; 251/30, 45, 46, 368, 28; 4/324, 325, 326

[56] References Cited

U.S. PATENT DOCUMENTS

| | | | |
|---|---|---|---|
| 2,158,787 | 5/1939 | Lorenz et al. | 251/45 |
| 2,283,973 | 5/1942 | Criss | 137/444 |
| 2,318,236 | 5/1943 | Layton | 137/444 |
| 2,407,170 | 9/1946 | Malek | 251/30 |
| 2,588,242 | 3/1952 | Hunter | 251/46 |
| 2,588,869 | 3/1952 | Pinaire | 137/444 |
| 2,608,991 | 9/1952 | Crockett | 137/413 |
| 2,734,524 | 2/1956 | Burriss | 137/445 |
| 2,738,801 | 3/1956 | Reaves | 137/449 |
| 2,827,073 | 3/1958 | Owens | 137/437 |
| 2,919,714 | 1/1960 | Mrazek | 251/30 |
| 2,991,481 | 7/1961 | Book | 137/403 |
| 3,090,592 | 5/1963 | Fleer | 251/30 |
| 3,118,646 | 1/1964 | Markey | 251/30 |
| 3,520,319 | 7/1970 | Jull et al. | 251/368 |
| 3,797,518 | 3/1974 | Holm et al. | 137/434 |
| 4,003,097 | 1/1977 | Book | 4/326 |
| 4,108,419 | 8/1978 | Sturman et al. | 251/46 |
| 4,182,364 | 1/1980 | Gilbert et al. | 137/426 |

Primary Examiner—Martin P. Schwadron
Assistant Examiner—G. L. Walton

Attorney, Agent, or Firm—Hugh Adam Kirk

[57] ABSTRACT

A remote-control valve having at least a two-part housing with a pressure inlet and adjacent outlet in one part, and which valve is opened and closed by a flexible continuous impermeable diaphragm at the base of a pressurizable frusto-conical chamber in the other part of the housing. This substantially conical chamber contains a free rubber ball which closes the apex opening from the chamber when the chamber is pressurized through a continuously open bypass from the inlet duct around the diaphragm in the first part of the housing. A projecting means such as a pin insertable through the apex of the chamber moves the ball away from its outlet duct to reduce the pressure in said chamber so that the pressure in the inlet duct will flex the diaphragm to open the valve to the outlet duct. Then when the projecting means or pin is retracted, the pressure from the inlet duct through the bypass will repressurize the chamber by moving the free ball into the apex outlet seat of the chamber, so that pressure will build up in this chamber and move the diaphragm back onto the inlet and outlet ducts to close the valve. The outlet apex duct from the chamber may be connected to the outlet duct in the first part through a second bypass which may be valved to adjust the flow therethrough. The operation of the projecting means may be manual, electrical such as by a solenoid, or mechanical such as by a lever and float when the valve is used to maintain a predetermined level of liquid in a tank, such as a toilet flush tank or a watering trough. A branch duct may be provided from the second bypass for refilling a toilet bowl when the valve is used for maintaining the liquid level in a toilet flush tank.

28 Claims, 5 Drawing Figures

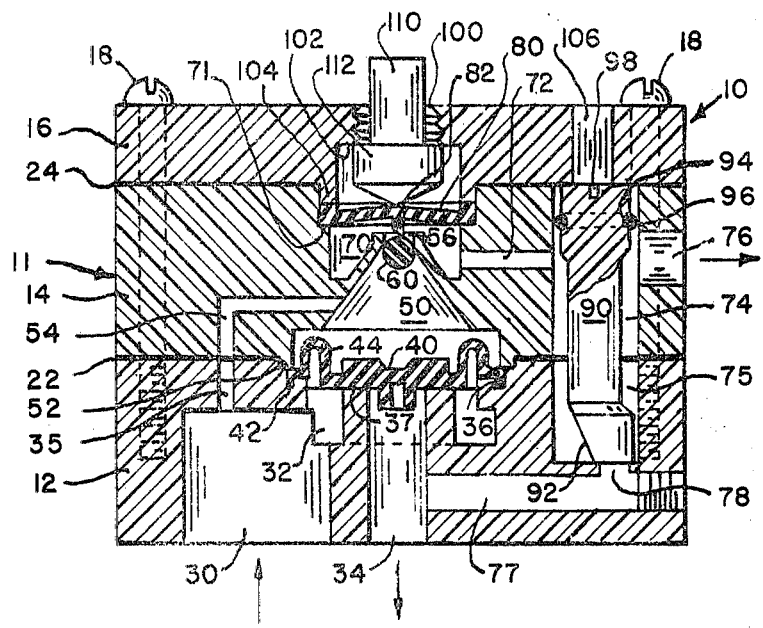
FIG. I
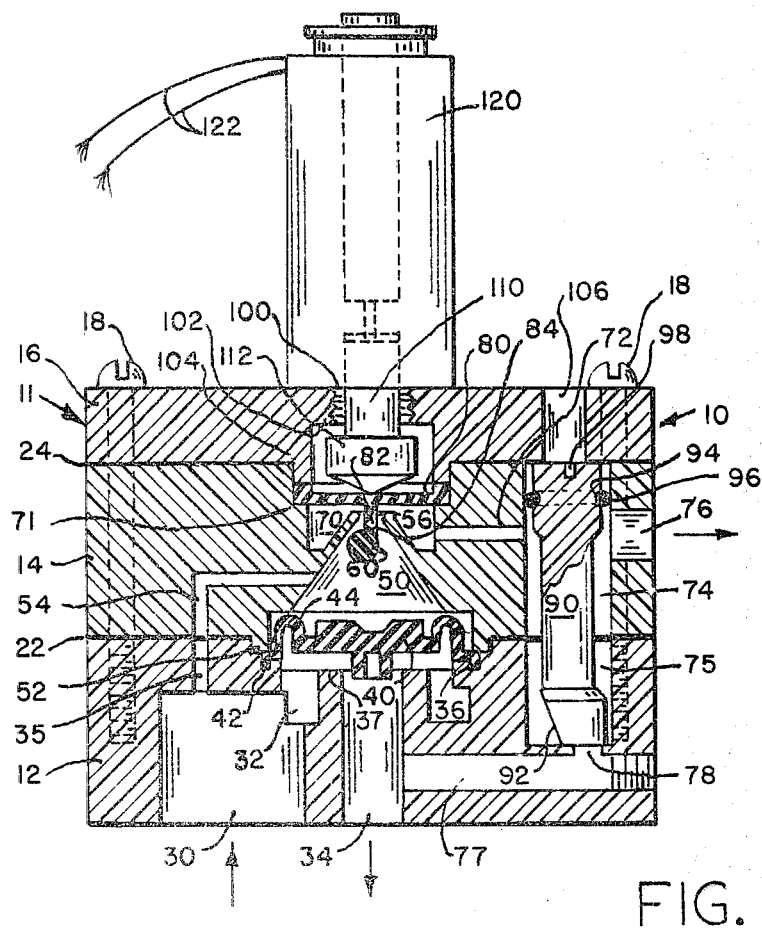
FIG. II

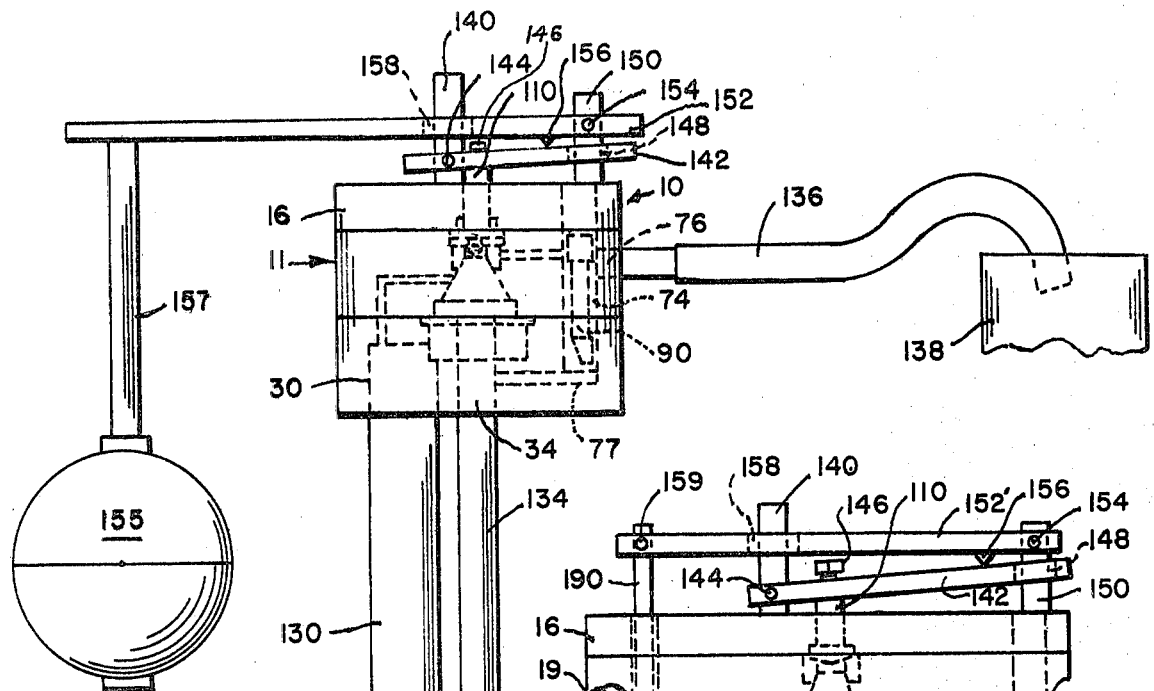
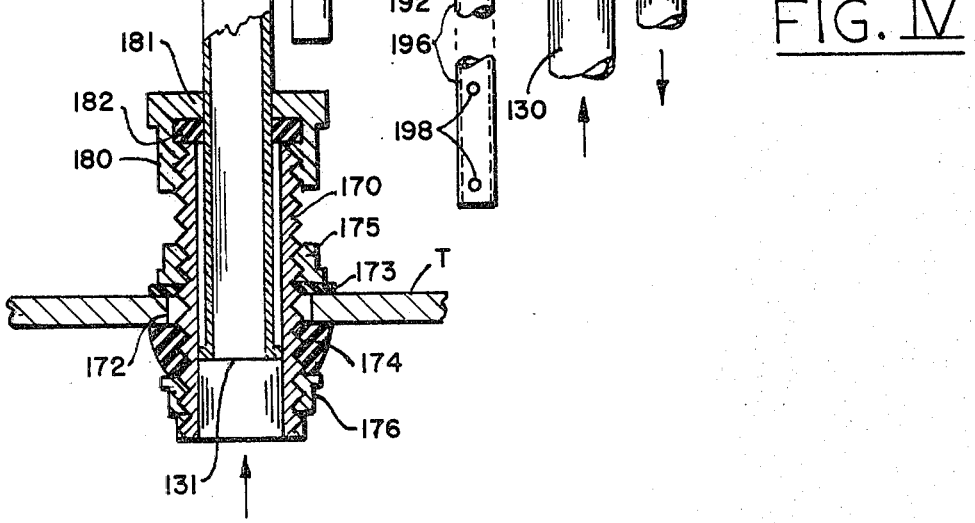
FIG. III
FIG. IV

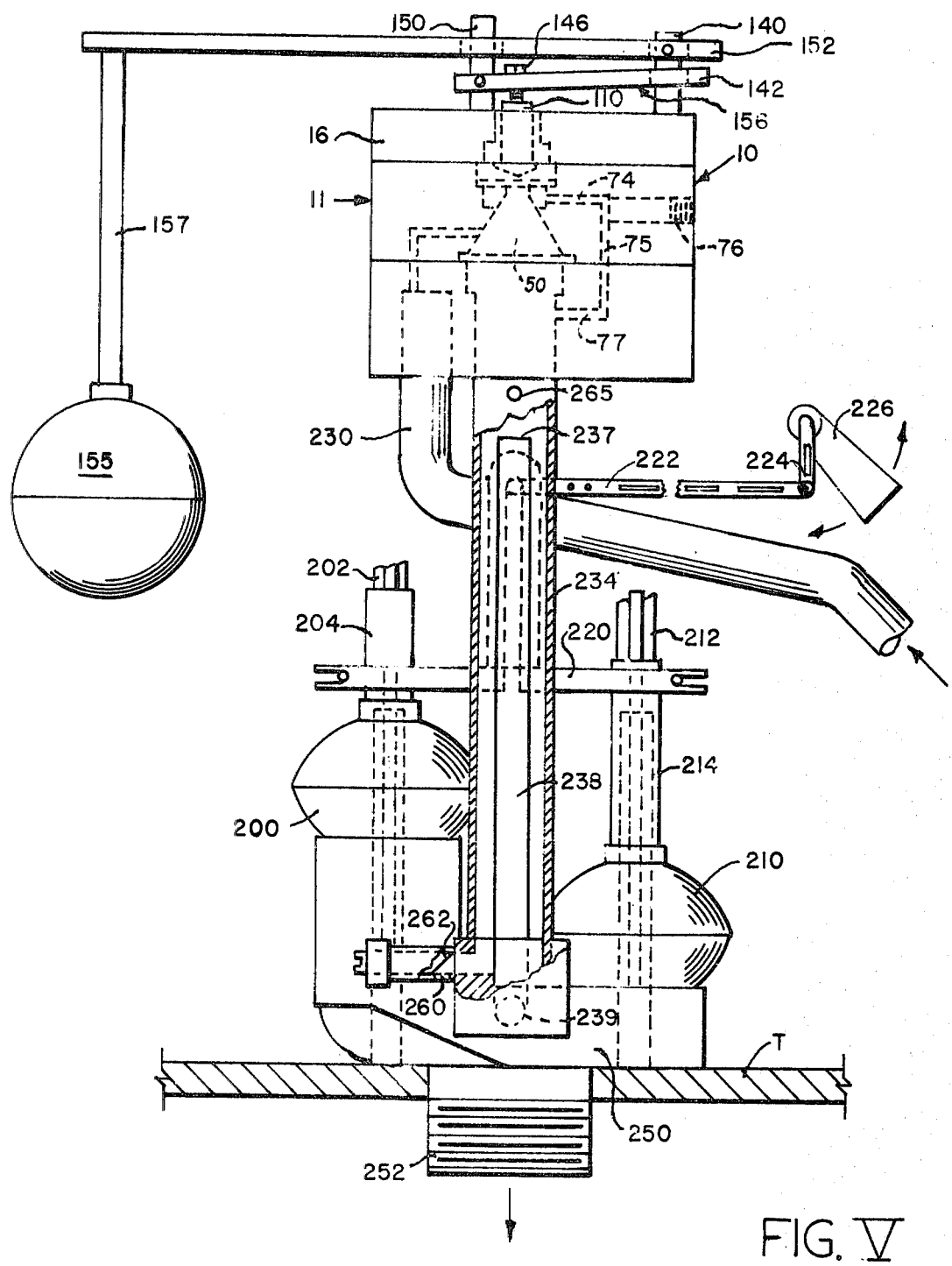
FIG. V

DIAPHRAGM AND BALL VALVE

BACKGROUND OF THE INVENTION

Previously liquid level control and flush diaphragm-type valves employed in tanks, such as flush tanks for toilets, had diaphragms with small holes through the diaphragms as the bypass for pressurizing the chambers on the opposite sides thereof, which holes readily and often became clogged, thus defeating the proper operation of these valves, particularly if the water contained salts which on standing formed precipitates that clogged the small holes in these diaphragms. Such diaphragms are shown in Criss U.S. Pat. No. 2,283,973 issued May 26, 1942 and Layton U.S. Pat. No. 2,318,236 issued May 4, 1943, both found in Class 137-Subclass 444.

Ball-type valves previously had their balls confined within chambers to insure their proper seating and not free to move throughout the chambers, and no ball-type valves have been found to be employed in chambers in which one wall was a flexible diaphragm. Furthermore, such balls were usually made of metal or material denser than the fluid they were surrounded by and to control, and they seated against flexible or resilient gaskets. Thus their action was relatively sluggish. Examples of such ball valves in fluid tank level control valve mechanisms are shown in the following U.S. patents: Pinaire U.S. Pat. No. 2,588,869 issued Mar. 11, 1952 and Crockett U.S. Pat. No. 2,608,991 issued Sept. 2, 1952, both found in Class 137-Subclass 413; and Reaves U.S. Pat. No. 2,738,801 issued Mar. 20, 1956 found in Class 137-Subclass 449. No one of these patents shows a valve having both a ball and a diaphragm, not to mention a ball in the chamber having one wall formed by the diaphragm, nor are their balls free to move through relatively large chambers, but instead are confined to chambers having diameters less than about twice the diameters of the balls.

SUMMARY OF THE INVENTION

Generally speaking, the diaphragm valve of this invention comprises adjacent inlet and outlet ducts on one side of a diaphragm which diaphragm simultaneously opens and closes these ducts. The other side of this diaphragm forms the base or bottom wall of a substantially conical chamber with an outlet at its apex valved by a rubber ball freely floating or moving in the chamber several times the volume of the ball. This freely movable ball is preferably of resilient material such as rubber or neoprene and has a density usually less or about the same as the fluid that is passed through the valve. A bypass duct comtinuously connects the pressure inlet through the valve housing to the conical chamber and thereby normally maintains the free ball closing the apex outlet thereof pressurizing the opposite side of the diaphragm for closing the valve. In order to open the valve, external means such as a pin is projected into the apex of the chamber to move the ball away from the apex and open its outlet. This external means may comprise a plunger in an outside sealed chamber, which may be sealed by a second diaphragm or piston. The opening of the apex of the conical chamber releases the pressure therein to permit the diaphragm to flex and open the valve or seal between the adjacent outlet and inlet ducts. The outlet from the apex of the chamber may be connected to the outlet duct of the valve and/or to a branch duct either or both of which may be valved for regulating the fluid flow therethrough.

The housing for this valve mechanism is separable into at least two parts, parted along the plane of the diaphragm, and may consist of a third separable part for the sealing portion of the ball valved outlet side of the conical chamber. The inlet and outlet ducts that are adjacent to each other form in effect a U-shaped duct with the diaphragm across the base of the "U". The bypass ducts between the inlet and outlet ducts and the substantially conical chamber are outside of the diaphragm. This bypass duct from the chamber to the outlet duct may contain an adjustable valve or flow-controlling means, particularly if there is a branch duct therefrom such as for filling a toilet bowl when the valve is used in a toilet flush tank. Thus the amount of liquid bypassed to fill the toilet bowl can be adjusted so as to fill but not overfill the toilet bowl tray.

The means for moving the ball valve from the apex outlet in the conical chamber can comprise a pin on a diaphragm, a piston rod of a piston in a cylinder, or other movable sealing means at the outlet from the chamber. This ball-moving pin-type means may be operated manually, electronically by an AC or DC solenoid, mechanically by levers attached to a float in a tank, or by fluid pressure including an air column which operates a piston through levers for maintaining a liquid level in a tank. Since very little movement is required for moving the free ball from its apex of the chamber, a double-action lever mechanism may be employed for its operation. This plunger or ball-moving means has the particular advantage that once the force on the plunger is released or fails, the valve will automatically shut-off to prevent flooding, overflow and/or waste of the liquid controlled thereby.

Also the valve mechanism of this invention may be employed with the fluid control system shown in applicant's previous U.S. patents, namely U.S. Pat. No. 2,991,481 issued July 11, 1961 and U.S. Pat. No. 4,003,097 issued Jan. 18, 1977.

OBJECTS AND ADVANTAGES

Accordingly, it is an object of this invention to produce a new, efficient, simple, effective and economic diaphragm and ball-type valve which opens and closes with its own applied fluid pressure.

Another object is to produce such a valve which has a positive shut-off in the event any of the controls therefor break or malfunction so as to prevent fluid loss due to flow through the valve.

Another object is to produce such a valve which is non-corrosive, long-lasting, and contains relatively few parts, no springs, and will operate on any type of fluid.

Another object is to produce such a valve which does not have small apertures which can get plugged easily with impurities or particles in the fluid.

Another object is to produce ball control valve in which the ball is free to move throughout a chamber many times its size and thereby presents an infinite number of seating surfaces for increasing the life of the valve.

Another object is to produce such a valve which can be used in any type of remote-control fluid system, such as in domestic and industrial appliances, toilets, watering tanks, drinking fountains, sprinkling systems, and the like.

Another object is to provide such a valve which can be readily adapted to the flush tanks of toilets without major alteration thereof or the requirement of additional space.

BRIEF DESCRIPTION OF THE VIEWS

The above mentioned and other features, objects and advantages and the manner of attaining them are described more specifically below by reference to embodiments of this invention shown in the accompanying drawings wherein:

FIG. I is an enlarged vertical section through one embodiment of the diaphragm and ball valve of this invention showing the valve in closed position;

FIG. II is a view similar to FIG. 1 showing the valve in open position under the control of an electric solenoid;

FIG. III is a side view of the valve shown in FIGS. I and II adapted for the control of a liquid level in a tank by means of a lever and float mechanism, and showing in section the telescopic mounting of the inlet duct through the bottom of a tank;

FIG. IV is a side view of the valve shown in FIG. III with parts broken away, and being controlled by the compression of air in a tube instead of by a float;

FIG. V is a side view of the valve according to FIGS. I and II adapted to control a two-level flush tank according to the mechanism shown in Book U.S. Pat. No. 4,003,097.

DETAILED DESCRIPTION OF PREFERRED EMBODIMENTS

I. The Valve Per Se

Referring first to FIGS. I and II, there is shown one embodiment of a valve 10 comprising a body or housing 11 which may be made of any convenient shape and size and of any suitable material, such as metal, plastic, or the like; however, for normal fluids, and particularly water, it has been found that plastic has advantages over metal in view of economics involved and its resistance against corrosion. In order for the easy assembly of the parts, and particularly the diaphragm in the valve, the body is usually divided at least into two separate pieces 12 and 14, and herein also it is shown to have a third piece or cover 16, which pieces or parts are held together by fastening means, preferably releasable, such as bolts 18. Preferably at least three equally angularly spaced bolts 18 are employed, and perforated gaskets 22 and 24 are held between the parts at least around the fluid ducts and chambers to prevent leakage of the ducts and chambers that communicate from one part to the other.

The lower part 12 herein is shown to contain the inlet duct 30 which herein terminates in an annular chamber 32 open along one side adjacent the diaphragm 40 and surrounding the outlet duct 34. The diaphragm 40 may comprise an axially extending peripheral flange 42 for fitting in a groove 36 surrounding the inlet duct annular chamber 32. This diaphragm 40 is preferably made of a flexible resilient plastic material such as a durable rubber, so that it can flex from the position shown in FIG. I to that in FIG. II by means of pressure of the liquid in the inlet duct 30. In order to facilitate this flexibility there also may be provided an annular bellows or channel-type ring 44 formed in the continuous and solid non-apertured diaphragm 40. It is important to note that this diaphragm is free of any small holes as usually provided in previous diaphragms for valves of this type, and thus there is no such aperture which can be plugged with small particles of sediment which may occur in the fluid which is being controlled by the valve 10 of this invention.

The second and herein central part 14 of the valve of this invention comprises a central chamber 50 preferably substantially conical or frusto-conical shape, the base of which chamber 50 fits over and around the periphery of the diaphragm 40 and is clamped in place thereby such as a peripheral flange or shoulder or rib portion 52 formed into the body part or piece 14. Thus the diaphram 40 is adjacent the base of the conical chamber 50. The inlet duct 54 into this chamber 50 connects through an aligned duct 35 in part 12 from the pressure inlet duct 30 so that the chamber 50 is continuously connected by the open ducts 35 and 54 to be normally pressurized with the same pressure as and by the fluid which is to be controlled and passed through the valve 10 of this invention.

The outlet from the chamber 50 is through a valved outlet duct 56 at the apex of the substantially conical chamber 50 which is normally closed by the small lightweight neoprene sphere or ball 60. This ball 60 is free to move about and float in the chamber 50 and readily moves with and by the flow or current of liquid through the chamber 50 toward the outlet 56 under the pressure normally applied in the chamber 50 so as to normally close the valved outlet 56 when the chamber 50 is pressurized. This valved outlet 56 herein is shown to communicate with an annular chamber 70 which herein is closed or sealed by a second flexible diaphragm 80 which has a central axially projecting pin 82. This pin 82 is insertable into and through the outlet or exit aperture 56 for positively moving the ball 60 away from its seat in outlet 56 in order to depressurize the chamber 50. This depressurizing of the chamber 50 opens the valve 10 of this invention by permitting the diaphragm 40 to flex under the input fluid pressure into the position shown in FIG. II, so that the pressurized fluid in duct 30 may readily flow under the diaphragm 40 and over the annular edge 37 of the outlet duct 34 formerly sealed by the diaphragm 40, and out through the outlet duct 34. Thus, as long as the pin 82 or other mechanical projecting means maintains the ball 60 away from its seat in the outlet 56 of chamber 50 so that the chamber 50 is open, the valve 10 will remain open. The movement of the pin 84 and/or the design of the outlet 56 is so that the diaphragm 80 can never completely close the chamber 50, and the chamber 50 remains open as long as the pin 84 has moved the ball 60 away from its seat 56. However, when any condition, desired or not, occurs so that the pin 82 is not positively urged into position shown in FIG. II, the flow and pressure of the fluid in the inlet duct 30 bypassed through the continuously open ducts 35 and 54 to chamber 50 forces the ball 60 back into its outlet seat 56 to close the chamber 50 as shown in FIG. I. This closing of chamber 50 immediately closes the valve 10 by the build-up of this inlet fluid pressure in the now closed chamber 50 to force the diaphragm 40 to engage the edge 37 and stop the flow of fluid between the adjacent ducts 32 and 34, and maintain the valve 10 closed as long as fluid pressure is maintained in the intake duct 30.

The end of the pin or projection 82 which inserts into the outlet 56 of chamber 50 preferably is beveled as shown at 84 so when it contacts the sphere or ball 60, it will tend to rotate the ball so that every time the ball 60 seats it will seat on another circular ring on its surface. Thus a new seating surface is presented for sealing the opening 56 each time the valve is opened and closed, thereby prolonging the operative life of the valve 10 and its ball 60.

From the annular outlet 70 of chamber 50 there is provided an outlet duct 72 which may communicate with branch ducts 74 and 76, with the branch duct 74 communicating through ducts 75 and 77 in the first part 12 with the outlet duct 34. The flow of the fluid through and from the chamber 50 through annular outlet chamber 70 and duct 72 and thence ducts 74 and 76 may be controlled by an adjustable rotatable valve mechanism 90 in the ducts 74 and 75 which controls what proportion of fluid from the chamber 50 flows out through branch duct 76 and what proportion is returned to the outlet duct 34 through ducts 75 and 77. Herein this valve 90 comprises a cylindrical plug having a beveled end 92 in duct 75 for opening and closing the aperture 78 to duct 77. The upper portion of the plug valve 90 may be provided with a groove 94 for an O-ring 96 and have in its outer exposed end a slot 98 by which a screwdriver or other tool may be used for rotating the beveled plug 90 for shutting off or permitting more or less of the fluid to be returned to the outlet duct 34 via ducts 77, while the rest of the fluid flows around the narrowed portion of the plug 90 and out through the branch duct 76.

In the specific embodiment shown herein there is a third part 16 of the valve's body or housing 11 which is provided herein with a threaded central aperture 100 which may have an inwardly enlarged portion 102 and a depending annular flange 104 for engaging and sealing the periphery of the second diaphragm 80 in its shouldered seat 71 of the annular outlet chamber 70 in part 14. This aperture 100 also may retain a headed button or plunger 110 having an outwardly flanged inner end 112 to retain it in the aperture 100 by the shoulder of portion 102. This plunger 110 is axially movable and contacts the sealing means or diaphragm 80 adjacent the pin 82 for urging the pin to unseat the ball 60 from the outlet 56 to open the valve 10 of this invention. Thus, many different external means can be provided for pushing on the end of the button or plunger 110, even including an electric solenoid 120 shown in FIG. II and threaded into the threaded aperture 100 so that the valve 10 can be controlled electrically from a remote location via the electrical conducting wires 122 connected to the solenoid 120. Accordingly, it is to be understood that other means than the diaphragm or seating means 80 and pin 82, as well as the peg or button 110 may be provided for positively moving the ball 60 away from its seat 56 in chamber 50 for controlling the operation of the valve 10 without departing from the scope of this invention.

There is also provided in part 16 an aperture 106 which communicates with the duct chamber 74 in part 14 so as to provide easy access with a tool for operating the valve 90, such as a screwdriver inserted through the aperture 106 into the groove 98 in the top of the adjustable valve means 90.

II. Tank Level Control

FIGS. III, IV and V disclose three different types of mechanisms for the use of the valve 10 shown in FIGS. I and II for controlling the liquid level in a tank, more specifically in a toilet flush tank.

First referring to FIG. III there is shown a section of the bottom of a toilet flush tank T through which the inlet duct 130 for the valve 10 is projected, sealed and telescopically adjustable.

The upper end of the inlet pressure liquid tube 130 is sealed into the inlet duct 30 of the valve 10 and the outlet duct 34 of the valve body 10 is herein connected to a downwardly extending outlet tube 134 whose lower open end is near the bottom of the tank T. These two tubes 130 and 134 could form a siphon except for the branch outlet ducts 77, 74 and 76 in the housing 10, the latter of which is connected to an overflow tube 138 via a flexible tube 136. The valve mechanism 90 inside the valve 10 adjusts the amount of liquid which is directed into the overflow tube 138 for filling a toilet bowl, and thus can prevent an excess or wastage of the water.

The valve 10 in FIG. III is controlled by a double-lever mechanism comprising two second-class levers 142 and 152 pivoted at their ends at 144 and 154, respectively, on fulcrum supports or posts 140 and 150. These posts may be attached to the top part 16 of the valve housing 11 or that side of the valve housing upon which the plunger 110 is located. The downward movement of the lever 152 urges the downward movement of the lever 142 via a depending cam portion 156 provided on the lever 152 which engages the lever 142 near its free outer end. The downward movement of the lever 142 may be limited by an adjustable stop such as a screw 146 intermediate its ends. This screw 146 correspondingly limits the downward movement of the button or plunger 110 which operates to open the valve 10. The freer ends of these second-class levers 142 and 152 may be provided with apertures 148 and 158, respectively, for fitting over the supporting posts 150 and 140, respectively, and for guiding the movement of these levers 142 and 152.

The freer outer end of the second-class lever 152 in the embodiment shown in FIG. III is provided with a float 155 which when bouyed-up by the liquid level in the tank T which raises the cam 156 which in turn permits the lever 142 to be raised by the action of the inlet fluid pressure in the chamber 50 of the valve 10 causing the ball 60 to close the chamber 50 and raise the pin 82 and plunger 110 and shut off the flow through the valve 10 by pressurizing the diaphragm 40 as described above. However, when the level of the liquid in the tank T is below that of the depending float 155, the weight of the float on the end of the lever arm 152 causes the cam portion 156 to press down on the lever 142 which in turn pushes down the button or plunger 110. This positive downward pressure on the plunger 110 moves the pin 82 in the diaphragm 80 to move the ball 60 away from its seat in the apex outlet 56 of the conical chamber 50 to reduce the pressure in the chamber 50 and open the valve 10 by permitting the inlet liquid pressure to flex the diaphragm 40. The inlet liquid then not only flows up through the intake tube 130 and through the valve 10 out through the outlet duct 134 to refill the tank, but also liquid is bypassed through ducts 35 and 54 (see FIGS. I and II) into the chamber 50 and out through ducts 72, 76 and 136 into the overflow duct 138 for filling the toilet bowl, and any excess liquid is returned through ducts 74, 75 and 77 into the outlet duct 134 to further fill the tank T.

Although the position of the float 155 on its depending support member 157 may be varied for changing or adjusting the level at which the valve 10 is to be operated, the whole mechanism also may be adjusted regarding level by the telescopic action of the intake tube 130 into the outside threaded nipple or sleeve 170 which extends through an aperture 172 in the botton wall of the tank T. On this sleeve 170 on each side of the bottom wall of the tank T are provided a pair of resilient gaskets 173 and 174 urged against the sleeve and bottom wall by ring nuts 175 and 176 to insure a fluid-tight connection and prevent leakage of the liquid from the tank T around the outside of the sleeve 170. The upper end of this sleeve 170 has an internally threaded and centrally apertured cap 180 with an inwardly extending flange 181 for seating a sealing gasket 182 and limiting the upward movement of the intake tube 130 which tube 130 has at its lower end an outwardly extending flange 131 which can abut the flange 181. The resilient sealing gasket 182 is urged by the cap nut 180 into sealing engagement between the top of the sleeve 170 and the outside of the intake or inlet tube 130. Thus by loosening this cap nut 180, the tube 130 can be telescoped up or down through the sleeve 170 for adjustment of the height of the valve 10 and its associated float 155 above the bottom of the tank for adjusting the liquid level at which the valve 10 will operate.

Referring now to FIG. IV there is shown the valve 10 and the inlet and outlet tubes 130 and 134 as shown in FIG. III, but instead of having a longer lever 152 to which the float 155 is attached, there is provided shorter lever 152' with a pivot pin 159 to which is connected the upper end of a piston 190 that is urged downwardly by a spring 192 to open the valve 10. This rod of this piston 190 with its spring 192 may be guided through the housing 11 of valve 10 via an aperture 39 in part 12 and smaller diameter axially aligned aperture 19 in parts 14 and 16 with the spring in aperture 39 being compressed between the piston head 192 and part 14. In and/or below part 12 is a cylinder 194 in which the piston head 192 is sealed for vertical movement and which cylinder 194 communicates with the upper end of a vertical tube 196 whose lower end extends down into the liquid in the tank T. This lower end may be provided with radial side apertures 198, if desired, to predetermine the level at which the rising liquid level in the tube 196 starts to compress the air in the tube 196 to raise the piston 190 upwardly to compress the spring 192 and operate the lever 152' to shut off or close the valve 10. Thus as the air pressure builds up to a certain point in the cylinder 194, which pressure corresponds to a predetermined level above the effective bottom end of the tube 196, then the valve 10 will operate to shut off the liquid filling the tank T.

Referring now to the embodiment shown in FIG. V, the valve 10 is adapted to the two-level flush tank control valve mechanism as shown in applicant's U.S. Pat. No. 4,003,097. Herein the outlet duct 234 and overflow duct 238 for the tank T are concentric tubes for supporting the valve 10, and the inlet duct 230 is a flexible tube for supplying the fluid pressure intake water for the tank T and the operation of the valve 10. Furthermore, the bypass duct 76 on the valve 10 is plugged so all the outlet of all liquid from the open conical chamber 50 is directed into the outlet duct 234 via ducts 74, 75 and 77.

In this embodiment the whole structure is mounted on the assembly for the flushing of the tank to a preselected one of two different levels corresponding to the different levels of the ball valves 200 and 210, respectively, mounted for vertical movement on vertical guideposts 202 and 212. The sleeves 204 and 214 connected to and extending above the outlet ball valves 200 and 210, respectively, are connected to an inverted T-shaped lever 220 connected by a link 222 to a flush handle lever 224 that may be oscillated in either direction. An upward thrust on the handle 226 raises the upper ball valve 200 for only partially draining the tank T such as for flushing the bowl when used as a urinal, and a downward thrust on the handle 226 raises the lower ball valve 210 for emptying the tank T for complete flushing of the bowl such as when it is used as a toilet and contains solids.

The overflow duct 238 has an open upper end 237 and has its lower end 239 connected directly into the base manifold outlet duct 250 from both valves 200 and 210 for flowing directly into the toilet bowl via the downward outlet duct 252. Most of the outlet liquid or water from the valve 10 flows through the outlet tube 234 around the outside of the inner overflow tube 238 and out through the valved outlet 260 near the bottom of the outlet tube 234 for filling the tank T. The valve 262 provided for this outlet 260 proportions the amount of liquid which will enter the tank T with respect to that held back for overflow into the top 237 of the inner tube 238 back into the toilet bowl. This overflow is preadjusted so that sufficient water will pass through the overflow tube 238 to fill the toilet bowl when the tank is flushed to the upper level. Since the toilet is used about five out of every six times as a urinal and thus usually only partially emptied, only one-sixth of the time is more water than necessary overflowed into the toilet bowl through the duct 238.

There is also provided at the upper end of the tube 234 a non-siphoning hole or aperture 265 so that the liquid in the tank T below the level of this hole 265 will not be siphoned into the toilet bowl after the valve 10 has been shut off.

It is to be clearly understood that the valve 10 shown in FIGS. I and II of this disclosure may also be adapted for other uses and control of other fluids than water at remote locations. It is a particular advantage of this valve 10, that if there is any malfunction of the control thereof, the pressure of the fluid that is in the inlet duct will automatically shut the valve 10 so as to prevent any loss by flooding, or overflow of the fluid controlled by the valve.

While there is described above the principles of this invention in connection with specific apparatus, it is to be clearly understood that this description is made only by way of example and not as a limitation to the scope of this invention.

I claim:

1. A liquid flow valve comprising:
   (A) an adjacent inlet and outlet,
   (B) a diaphragm for simultaneously opening and closing said adjacent inlet and outlet on one side of said diaphragm,
   (C) a substantially conical chamber on the other side of said diaphragm having an inlet duct continuously open at all times to said adjacent inlet regardless of the opening and closing of said adjacent inlet and outlet of said diaphragm, said open inlet duct normally pressurizing said chamber for causing said diaphragm to close said adjacent inlet and outlet, said chamber having a valved outlet at its apex,
   (D) a freely movable ball in said chamber movable by the flow of the liquid through said conical chamber for directing and maintaining said freely movable ball adjacent said apex of said conical chamber at all times and for normally closing said valved outlet from said chamber when not obstructed by external means, and (E) external means for moving said ball from said valved outlet to reduce the pressure in said conical chamber from said inlet duct to permit said diaphragm to be moved by said adjacent inlet pressure to open said valve by opening said adjacent inlet and outlet.

2. A valve according to claim 1 wherein said diaphragm is a continuous impervious flexible sheet forming a wall of said chamber.

3. A valve according to claim 1 including a second diaphragm in a second chamber communicating with said valved outlet and said adjacent outlet.

4. A valve according to claim 3 wherein said external means comprises a projection on said second diaphragm for unseating said freely movable ball from said valved outlet.

5. A valve according to claim 1 wherein said external means comprises a solenoid.

6. A valve according to claim 1 wherein said external means comprises a float and lever mechanism.

7. A valve according to claim 1 wherein said external means comprises a piston and lever means.

8. A valve according to claim 1 wherein said chamber has several times the volume of said ball.

9. A valve according to claim 1 for maintaining a level of liquid in a tank.

10. A valve according to claim 9 including a telescopic inlet duct connected to said adjacent inlet for varying the height of said valve with respect to the level in said tank.

11. A valve according to claim 1 wherein said movable ball is composed of a rubber.

12. A liquid flow valve comprising:
(A) a pressurized inlet duct having an inlet,
(B) an outlet duct having an outlet adjacent said inlet,
(C) a diaphragm for simultaneously closing and opening said adjacent inlet and outlet on one side of said diaphragm,
(D) a first pressure and substantially conical chamber on the opposite side of said diaphragm from said adjacent inlet and outlet for operating said diaphragm and having a valved outlet at the apex of said conical chamber,
(E) a first bypass duct continuously open at all times from said inlet duct to said conical chamber regardless of the closing and opening of said adjacent inlet and outlet by said diaphragm, said bypass duct normally pressurizing said conical chamber to cause said diaphragm to close said adjacent inlet and outlet,
(F) a freely movable ball in said first conical chamber movable by the flow of the liquid through said first conical chamber for directing and maintaining said freely movable ball adjacent said apex of said chamber, and for normally closing said valved outlet at said apex of said conical chamber when not obstructed by external means,
(G) a second chamber connected through said valved outlet to said first chamber,
(H) a sealing means for said second chamber and having a plunger for moving said ball in said conical chamber to open said valved outlet between said chambers,
(I) a second bypass duct between said second chamber and said outlet duct, and
(J) external means operative for moving said plunger for moving said ball for opening said valved outlet to reduce the pressure in said first conical chamber through said second bypass duct, whereby said pressurized liquid in said inlet duct operates said diaphragm to open said valve for liquid flow from said inlet to said adjacent outlet while said external means is operated.

13. A valve according to claim 12 wherein said second bypass duct has a valved outlet.

14. A valve according to claim 12 for controlling the level of a liquid in a tank wherein said pressurized inlet duct is adjustable in length from the bottom of the tank for varying the level of liquid in the tank.

15. A valve according to claim 14 wherein said variable inlet duct comprises telescopic sections.

16. A valve according to claim 12 wherein said external means comprises a float and lever mechanism.

17. A valve according to claim 12 wherein said external means comprises a solenoid.

18. A valve according to claim 12 wherein said external means comprises an air-operated piston and lever mechanism.

19. A valve according to claim 12 for a toilet flush tank and wherein said second bypass is a valved duct connected to the toilet bowl.

20. A valve according to claim 12 for a toilet flush tank wherein said outlet duct is connected to the outlet for said tank.

21. A valve according to claim 12 for a toilet flush tank wherein said outlet duct is connected to the overflow duct of said tank and said outlet duct has a valved outlet into said tank for proportioning the liquid between said overflow duct and said tank.

22. A valve according to claim 12 wherein said sealing means comprises a second flexible diaphragm.

23. A valve according to claim 12 wherein said sealing means comprises a piston in a cylinder.

24. A valve according to claim 12 wherein said movable ball is composed of a rubber.

25. A valve according to claim 12 wherein said first conical chamber has several times the volume of said ball.

26. A pressure-operated diaphragm valve having a body comprising:
(A) an inlet duct for liquid under pressure,
(B) an outlet duct adjacent said inlet duct,
(C) a continuous diaphragm having one side thereof opening and closing the flow of liquids between said inlet and said outlet ducts,
(D) a substantially conical chamber on the other side of said diaphragm, the base of which chamber comprises said diaphragm, said chamber having a valved outlet at its apex,
(E) a freely movable ball in said conical chamber movable by the flow of liquid through said conical chamber to maintain said ball adjacent said valved outlet and to seat said ball in said valved outlet for closing said valved outlet when not obstructed by external means,
(F) a bypass duct continuously open at all times from said inlet duct to said conical chamber regardless of the position of said diaphragm for opening and closing said inlet duct and said adjacent outlet duct, whereby the pressure in said inlet duct pressurizes said conical chamber and urges said ball against said valved outlet to close said valved outlet, and
(G) external means for moving said ball from said seat in said valved outlet into said conical chamber for reducing the pressure in said conical chamber so that the pressure in said inlet duct against said one side of said diaphragm will move said diaphragm into said conical chamber and open said inlet duct to said outlet duct, and when said external means is withdrawn, said ball closes said valved outlet to repressurize said conical chamber and return said diaphragm to close said inlet duct and said adjacent outlet duct.

27. A valve according to claim 26 wherein said movable ball is composed of a rubber.

28. A valve according to claim 26 wherein said conical chamber has several times the volume of said ball.

* * * * *